Jan. 31, 1956   J. A. SPRUNG   2,733,143
MULTILAYER COLOR FILM FOR INTEGRAL MASKING
Original Filed July 16, 1949
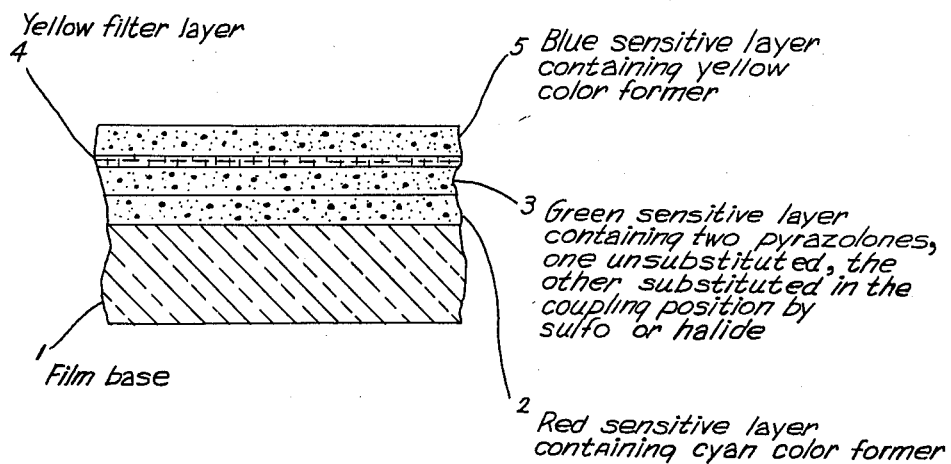
JOSEPH A. SPRUNG
INVENTOR
BY
ATTORNEYS

United States Patent Office 2,733,143
Patented Jan. 31, 1956

2,733,143
MULTILAYER COLOR FILM FOR INTEGRAL MASKING

Joseph A. Sprung, Binghamton, N. Y., assignor to General Aniline & Film Corporation, New York, N. Y., a corporation of Delaware Original application July 16, 1949, Serial No. 105,267, now Patent No. 2,704,709, dated March 22, 1955. Divided and this application June 17, 1953, Serial No. 362,405

8 Claims. (Cl. 95—2)

The present invention relates to a method for producing integral correction masks during the processing of multilayer color material and to the masked film thus obtained. This is a division of my copending application Serial No. 105,267, filed July 16, 1949, entitled "Masking Process for Multilayer Color Film," now Patent No. 2,704,709.

In the process most widely used at the present time for the processing of color film, yellow, magenta and cyan dye images are produced in the blue, green and red sensitive layers, respectively, of multilayer material by the method known as color development. This method involves the development of developable multilayer material with a primary aromatic amino developer in the presence of color formers while causing the formation in situ with the developed silver images of a yellow azomethine dye image in the blue sensitive layer, a magenta azomethine dye image in the green sensitive layer and a cyan quinonimine dye image in the red sensitive layer.

If the spectral characteristics of these dyes were ideal, it should be possible to produce color duplicates or color prints in true color from the color transparency by proper exposure onto a similar material and processing of the exposed material by color development. Unfortunately, however, the dye images formed as above do not have perfect spectral transmission, and as a consequence the duplicates or prints are greatly degraded.

An ideal yellow dye should transmit green and red; an ideal magenta, blue and red; and an ideal cyan, blue and green light completely. Most yellow dyes are quite satisfactory but the magenta dyes as a rule are deficient in their blue transmission and the cyans deficient in both blue and green. Thus, if these three subtractive color images were superimposed in an integral tripack, it is manifest that the blue portion of the exposing light would be modulated by all three dye images instead of the yellow image only, and the green portion of the exposing light would be modulated by the cyan image as well as the magenta image.

To correct the deficiency in the blue transmission of the magenta dye image, the so-called masking technique is used. If a positive yellow image of correct density and gradation be superimposed in exact register with the negative magenta image (e. g., maximum density of yellow masking image should be equal to the blue absorption of the magenta dye at maximum density), it would appear, when the combined images are examined through a blue filter, as if the magenta dyestuff image possessed identical blue transmission in both low and high density regions. Similarly, a red positive masking image would correct for the deficient blue and green transmission characteristics of the negative cyan quinonimine dye image.

In Hanson U. S. P. 2,449,966, granted September 21, 1948, there is described an integral masking process in which yellow and red azo dyes are incorporated in the green and red sensitive layers respectively of multilayer material. During the process of color development, the azo linkages are displaced image-wise by the primary aromatic amino color developer to produce magenta and cyan azomethine images in combination with yellow and red azo masking images respectively.

The azo linkages are sometimes displaced rather slowly and incompletely during the color development step, and therefore it is difficult to obtain azomethine (quinoneimine) color images and corresponding masking images of satisfactory density and contrast during the usual processing time.

It has now been discovered that the objections to the above method can be readily overcome by forming yellow and red masking images in the green and red sensitive layers respectively by the method of diazo coupling. This masking procedure is based on the observation that during color development, the color formers are utilized in an image-wise manner. At maximum dye density, nearly all of the color former is converted to the dye image whereas in the "whites," the color former is nearly unchanged. Thus, if such a color developed film were subsequently treated with a diazonium salt, an azo dye masking image of inverse gradation to the original image would be obtained.

The preparation of integral azo dye masking images by such procedure constitutes the purposes and objects of the present invention.

As will be evident from what has been said, my invention in its broadest aspects envisages the formation of the color masks by correlating with the usual processing of multilayer material by the color forming development method of a diazo coupling step usually effected subsequent to fixing. In its more specific aspects, however, my invention serves to produce masks of the desired color, density and gradation by controlling the following factors, to wit:

(1) Selection of proper diazonium compound;
(2) Adjustment of the pH of the coupling solution;
(3) Variation in the time of diazo coupling;
(4) Incorporation of the proper ratio of color formers which (a) possess and (b) do not possess substituents in the coupling positions; and
(5) Control blocking of the coupling positions prior to diazo coupling.

The diazonium compound which is utilized for coupling with residual color former to produce the azo dye masks may be derived from any of the aromatic amines generally employed in the manufacture of azo dyes. Examples of such amines are aniline, sulfanilic acid, metanilic acid, 3-chloro-aniline, 2,5-dichloroaniline, o-anisidine, p-toluidine, o-nitroaniline, p-anisidine, o-toluidine, p-nitroaniline, 2-chloroaniline, 4-nitro-2-methoxy aniline, 4-benzoylamino-2,5-diethoxy aniline, p-diethylamino aniline, 5-methyl-2-methoxy aniline, 2-methyl-4-nitroaniline, 4-chloro-2-methyl aniline, 1-naphthylamine, 4-chloro-2-nitroaniline, and the like.

It is to be understood, however, that these examples are merely representative and that other diazonium compounds may be utilized so long as they give the desired color and density with the color couplers selected.

The formation of the diazonium compound from the aforesaid amines follows the customary practice of diazotizing the amine with sodium nitrite and an inorganic acid at low temperatures followed by buffering of the diazonium salt solution to the appropriate pH with a suitable buffering agent such as sodium acetate.

Not all diazonium salts are alike in their coupling potentials. For example, sulfanilic acid or p-nitroaniline which contains an electronegative substituent in the molecule yield diazonium salts having high coupling potentials and which undergo coupling reactions in solutions buffered to a relatively low pH. On the other hand, diazonium salts containing electropositive substituents, such as those derived from p-anisidine or p-diethylamino aniline, have lower coupling potentials and undergo the diazo coupling reaction only in media which are buffered to a higher pH than the above. It is therefore possible to vary the density and gradation of the masking images by selecting the appropriate color former and by adjusting the coupling time and the pH of the diazonium salt solution.

It has been previously pointed out that for practical purposes the transmission of the yellow dyes produced on color forming development are satisfactory. This being so, it is unnecessary to form a mask in the blue sensitive layer bearing the yellow dye image.

The color formers which yield satisfactory yellow azomethine dye images on color forming development are those of the acylacetanilide type having the following general formula:

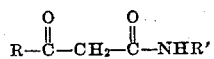

wherein R is an aromatic radical such as phenyl, acylaminophenyl, i. e., stearlyaminophenyl, lauroylaminophenyl, aminophenyl, i. e., decylaminophenyl, octadecylaminophenyl, and the like, alkyl radical such as methyl, ethyl, lauryl, stearyl, and the like, and R' is an aromatic radical as above, or alkyl such as stearyl, lauryl, myristyl, and the like. Color formers within this class will couple readily with most diazonium salts only if the pH be greater than 6. Consequently, it is possible to avoid the formation of an unwanted yellow masking image in the blue sensitive layer by buffering the diazo masking solution to a pH of approximately 5. The utilization of color formers of the above type for producing the yellow dye image while avoiding the formation of a masking image in the blue sensitive layer constitutes a very important feature of the present invention.

Another discovery contributing largely to the success of my invention is that color formers which contain replaceable groups in the coupling position, such as sulfonic acid groups or halogen atoms, i. e., chlorine or bromine, are not affected by diazonium salts, but yield azomethine or quinonimine dye images due to the displacement of the substituent in the coupling position by the oxidized developer. The color formers not substituted in the coupling position, however, readily couple with diazonium compounds to yield azo dyes. This finding is better illustrated by the following reactions involving α-hydroxy naphthoic acid amide couplers, on the one hand, and pyrazolone couplers on the other hand.

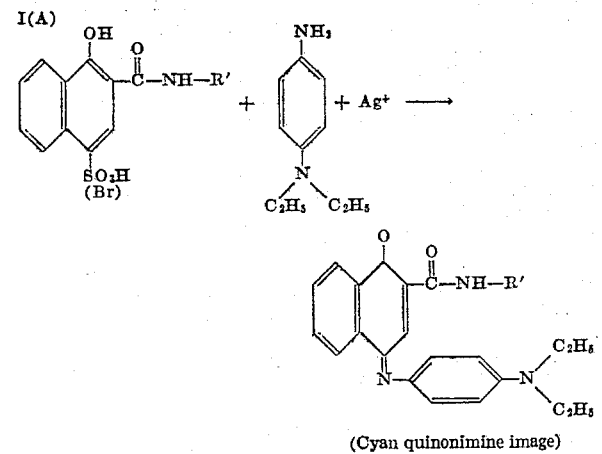

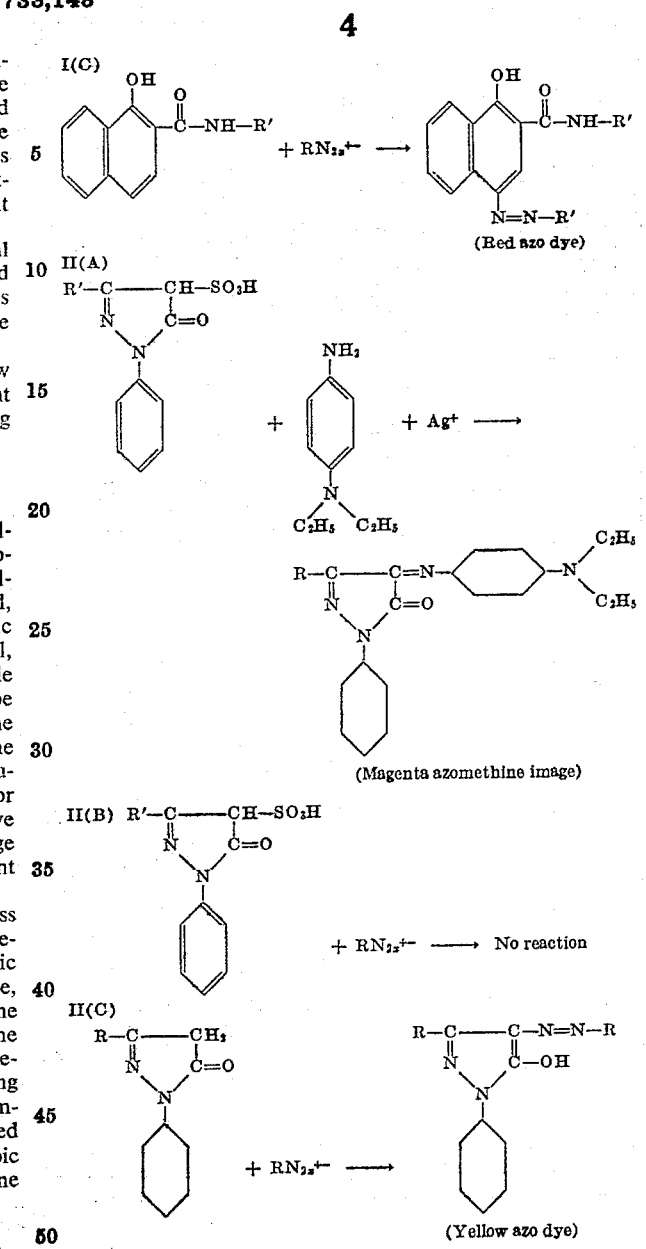

As a consequence of this discovery, it is possible to impart to the masking images the desired characteristics by admixing substituted and unsubstituted color formers in selected ratios.

An alternative or supplemental method of controlling the formation of the yellow azo masking image in the green sensitive layer involves a controlled blocking of the coupling position of the pyrazolone color former which contains no replaceable substituent. I have found that if the color developed film be bathed in an aldehyde solution, such as formaldehyde, glyoxal, etc. for selected periods of time, the coupling ability of the pyrazolone color former with diazonium salts is reduced depending upon the time of treatment. This result is apparently due to the formation of a non-displaceable methylene group between two molecules of the pyrazolone or between the pyrazolone and the gelatine according to the following equation:

wherein X represents another molecule of the pyrazolone or gelatin. The formation of the diazo blocking methylene linkage in this procedure is greatly accelerated by using formaldehyde or glyoxal solutions of high alkalinity.

The photographic material which is to be subjected to the processing contemplated herein may be constructed as follows: On a film base there is cast a red sensitive silver halide emulsion layer containing a mixture of two cyan color formers, one of which contains a replaceable group, such as sulfo or halogen, in the coupling position, and the other of which is free from such substituent. The color formers employed in the red sensitive bottom layer are preferably α-hydroxy naphthoic acid amides containing a radical rendering the color formers fast to diffusion, preferably a radical having a carbon chain of at least 12 carbon atoms.

Over the red sensitive bottom layer there is cast a gelatin layer serving to separate the red sensitive layer from the green sensitive layer.

The green sensitive silver halide emulsion layer cast upon the separation layer contains a mixture of two magenta color formers, one of which contains a replaceable substituent in the coupling position, such as sulfo, and the other of which is free from such substituent. The magenta color formers are preferably of the pyrazolone class containing a radical as of the above type, rendering them fast to diffusion in the emulsion layer.

Over the green sensitive layer there is cast a filter layer which may be of colloidal silver or a dischargeable yellow dye, and over the filter layer is cast a blue sensitive silver halide emulsion layer containing a yellow color former which is preferably an acylacetanilide containing a radical of the aforementioned type, rendering the compound fast to diffusion in the emulsion.

Examples of yellow color formers of the aforestated class which I have found to be effective not only for the development of the yellow azomethine dye image but also to preclude the formation of a yellow azo dye masking image are the following:

3-(p-stearoylamidobenzoylacetamido)-isophthalic acid
4-(α-sulfostearylamidobenzoyl)-acetanilide
3 - benzoylacetamido - 4 - (N - methyl - octadecyl - amino)-benzoic acid
4-(p-stearoylamidobenzoylacetamido)-phenylglycine
4-(m-stearylamidobenzoylacetamido)-benzoic acid
p-Laurylaminobenzoylacetanilide
3-(stearoylacetamido)-isophthalic acid
3 - acetoacetamido - 4 - (N - methyloctadecylamino) - benzoic acid
4-(myristoylacetamido)-phenylglycine
2 - (acetoacetamidophenyl) - 1 - octadecylbenzimidazole - 5-sulfonic acid
3 - (propioacetamidobenzamido) - 5 - myristamido - p - toluenesulfonic acid
4-stearoylacetamido-benzenesulfonic acid
Lauroylacetanilide
3-(myristoylacetamido)-isophthalic acid
2 - (m - benzoylacetamidophenyl) - 1 - octadecylbenz - imidazole-5-sulfonic acid
3 - (p - benzoylacetamidobenzamido) - 5 - stearoylamido- p-toluenesulfonic acid Examples of magenta color formers containing no replaceable substituent in the coupling position are the following:

1 - (4' - phenoxy - 3' - sulfophenyl) - 3 - heptadecyl - 5-pyrazolone
1-(3'-carboxyphenyl)-3-heptadecyl-5-pyrazolone
1-(4'-sulfophenyl)-3-heptadecyl-5-pyrazolone
1-(4'-carboxyphenyl)-3-undecyl-5-pyrazolone
1-(2'-methyl-5'-sulfophenyl)-3-heptadecyl-5-pyrazolone
1 - (2' - methoxy - 4' - sulfophenyl) - 3 - heptadecyl - 5 - pyrazolone
1 - (2' - methoxy - 5' - sulfophenyl) - 3 - (3' - stearyl - aminophenyl) - 5 - pyrazolone.
1 - (3' - sulfomethylenephenyl) - 3 - heptadecyl - 5 - pyrazolone
1 - (3' - sulfomethylene - 4' - phenoxyphenyl) - 3 - heptadecyl - 5 - pyrazolone
1 - (3' - stearylaminophenyl) - 3 - methyl - 5- pyrazolone
1 - (3' - sulfophenyl) - 3 - (4" - stearylaminophenyl) - 5-pyrazolone
1 - (3' - stearylamino - 5' - sulfophenyl) - 3 - methyl - 5-pyrazolone Examples of magenta color formers containing a replaceable substituent in the coupling position are the following:

1-phenyl-3-heptadecyl-5-pyrazolone-4-sulfonic acid
3-heptadecyl-5-pyrazolone-4-sulfonic acid
1 - (3 - carboxyphenyl) - 3 - heptadecyl - 5- pyrazolone - 5-sulfonic acid
1 - (4 - carboxyphenyl) - 3 - heptadecyl - 5 - pyrazolone - 4-sulfonic acid
1 - (β- sulfoethyl) - 3 - (4 - stearamidophenyl) - 5 - pyrazolone-5-sulfonic acid
1 - (2,6 - dimethylphenyl) - 3 - heptadecyl - 5 - pyrazolone-4-sulfonic acid Examples of cyan color formers containing no replaceable substituent in the coupling position are the following:

1 - hydroxy - 2 - naphthoyl - 2' - N - methyloctadecyl - amino-5"-sulfoanilide
1 - hydroxy - 2 - naphthoyl - 4' - stearylamino - 2' - sulfoanilide
1 - hydroxy - 2 - naphthoyl - 4' - laurylamino - 7' - sulfonaphthalide
1 - hydroxy - 2 - naphthoyl - 4' - octadecylamino - 2' - sulfoanilide
1-hydroxy-2-naphthoylbenzidide
1 - hydroxy - 2 - naphthoyl 4' - N - methyl - N - dodecylaminoanilide
1 - hydroxy - 2 - naphthoyl - 4' - stearylamino - 3' - sulfoanilide
1 - hydroxy - 2 - naphthoyl - 4' - N - methyl - N - dodecylamino - 3' - sulfoanilide Examples of cyan color formers containing a replaceable substituent in the coupling position are the following:

1 - hydroxy - 2 - naphthoyl - N - octadecylamide - 4'-sulfonic acid
1 - hydroxy - 2 - naphthoyl - 3' - octadecylamino - 4' - sulfoanilide-4-sulfonic acid
1 - hydroxy - 2 - naphthoyl - 3' - octadecylamino - 4' - carboxyanilide-4-sulfonic acid
1 - hydroxy - 2 - naphthoyl - 3' - oleylamino - 4' - sulfoanilide-4-sulfonic acid
1 - hydroxy - 2 - naphthoyl - 3' - dodecylamino - 4' - sulfoanilide-4-sulfonic acid
1 - hydroxy - 2 - naphthoyl - 3' - abiethylamino - 4' - sulfoanilide-4-sulfonic acid
1 - hydroxy - 2 - naphthoyl - 3' - cholylamino - 4' - sulfoanilide-4-sulfonic acid
1 - hydroxy - 2 - naphthoyl - 4' - stearylaminoanilide - 4-sulfonic acid
1 - hydroxy - 2 - naphthoyl - 4' - decoxyanilide - 4 - sulfonic acid
1 - hydroxy - 2 - naphthoyl - 4' - heptadecylamino - 2'-sulfoanilide-4-sulfonic acid For similar compounds, reference is made to U. S. P. 2,343,051 of Froehlich et al., granted February 29, 1944.

Processing of the multilayer film constituted as above according to the negative-positive process is effected as follows:

After exposure, the multilayer material is color developed with a primary aromatic amino developer such as a p-diethylaminoaniline after which it is short-stopped, bleached with a ferricyanide solution, fixed in hypo, and then submitted to a masking solution containing a diazonium salt buffered to the proper pH, i. e., approximately 5, by the addition of sodium acetate. The material is finally washed, yielding a negative containing in the appropriate layers negative yellow, magenta and cyan dye images, the layers bearing the magenta and cyan images also containing a positive yellow and red printing mask respectively.

Processing of color reversible material constituted as above may be effected as follows: After exposure the film is developed in a black and white developer such as metol-hydroquinone, short-stopped, re-exposed and color-developed as above. The film is then subjected to a clearing bath after which it is bleached in a ferricyanide solution, fixed, and then subjected to the masking solution containing the diazonium salt properly buffered with sodium acetate. In this case the color developed images are positives and the printing masks negatives.

The invention is illustrated by the following self-explanatory drawing which shows in section, a multilayer material carrying on a base 1 a red sensitive silver halide emulsion layer 2 containing a cyan color former, a green sensitive silver halide emulsion layer 3 for the magenta image containing two pyrazolones, one of which is unsubstituted in the coupling position while the other is substituted in the coupling position by a sulfo group or a bromine or chlorine atom, a yellow filter layer 4, and a blue sensitive silver halide emulsion layer 5 containing a yellow color former.

The invention is further illustrated by the following examples, although it is to be understood that the invention is not restricted thereto.

*Example I*

A photographic multilayer material constructed as previously outlined and containing in the blue sensitive top layer as the yellow color former, 3-(p-stearoylaminobenzoylacetamido)-isophthalic acid, in the green sensitive layer as the magenta color former, a mixture of 1-(4'-phenoxy-3'-sulfophenyl)-3-heptadecyl-5-pyrazolone and 1-phenyl-3-heptadecyl-5-pyrazolone-4-sulfonic acid, and in the red sensitive layer as the cyan color former a mixture of 1-hydroxy-2-naphthoyl-N-octadecylamide-4-sulfonic acid and 1-hydroxy-2-naphthoyl-2'-N-methyloctadecylamino-5'-sulfoanilide is exposed and then processed as follows:

Step 1.—Color development, 15 minutes (20° C.):
  Water _____ cc__ 750
  p-Diethylaminoaniline hydrochloride __ grams__ 2.75
  Hydroxylamine hydrochloride _____ do____ 1.2
  Sodium sulfite (anhydrous) _____ do____ 2.0
  Sodium carbonate (monohydrate) _____ do____ 66.0
  Potassium bromide _____ do____ 2.5
  Water to make 1000 cc.
Step 2.—Short stop, 1 minute:
  Sodium bisulfite _____ grams__ 50.0
  Water to make 1000 cc.
Step 3.—Harden, 4 minutes (20° C.):
  Water _____ cc__ 1000
  Potassium chrome alum _____ grams__ 30.0
Step 4.—Wash, 10 minutes.
Step 5.—Bleach, 5 minutes (20° C.):
  Water _____ cc__ 750.0
  Potassium ferricyanide _____ grams__ 60.0
  Potassium bromide _____ do____ 15.0
  Dibasic sodium phosphate _____ do____ 13.0
  Sodium bisulfate _____ do____ 6.0
  Water to make 1000 cc.
Step 6.—Wash, 3 minutes.
Step 7.—Fix, 5 minutes (20° C.):
  Water _____ cc__ 1000.0
  Sodium thiosulfate _____ grams__ 200.0
Step 8.—Wash, 5 minutes.
Step 9.—Masking solution, 2 to 5 minutes (20° C.):
  1.91 parts of sulfanilic acid (monohydrate) is dissolved in 500 parts of warm water. The solution is cooled quickly to 5° C., acidified with 1.5 parts of concentrated hydrochloric acid and diazotized with 0.7 part of sodium nitrite in 25 parts of water. The pH of the diazonium salt solution is adjusted to approximately 5 by the addition of 0.4 part of sodium acetate (trihydrate).
Step 10.—Wash, 15 minutes.

The completely processed film contains negative yellow and magenta azomethine dye images in the blue and green sensitive layers and a cyan quinonimine dye image in the red sensitive layer in combination with positive yellow and red azo dye masking images in the green and red sensitive layers respectively. No mask is formed in the blue sensitive layer.

*Example II*

A color reversible multilayer material constructed as in Example I is exposed and processed as follows:

Step 1.—Primary silver development, 12 minutes (20° C.):
  Water _____ cc__ 750.0
  Metol _____ grams__ 3.0
  Sodium sulfite (anhydrous) _____ do____ 50.0
  Sodium carbonate (monohydrate) _____ do____ 40.0
  Sodium thiocyanate _____ do____ 2.0
  Potassium bromide _____ do____ 2.0
  Water to make 1000 cc.
Step 2.—Short stop, 3 minutes (20° C.):
  Sodium bisulfite _____ grams__ 50.0
  Water to make 1000 cc.
Step 3.—Wash, 1 minute.
Step 4.—Second exposure.
Step 5.—Color development, 18 minutes (20° C.):
  Water _____ cc__ 750.0
  Sodium bisulfite _____ grams__ 1.0
  p-Diethylaminoaniline hydrochloride __ do____ 3.0
  Sodium carbonate (anhydrous) _____ do____ 67.5
  Potassium bromide _____ do____ 2.5
  Water to make 1000 cc.
Step 6.—Clearing bath, 3 minutes (20° C.):
  Water _____ cc__ 750.0
  Sodium bisulfite _____ grams__ 10.0
  Sodium acetate _____ do____ 30.0
  Water to make 1000 cc.
Step 7.—Harden, 5 minutes (20° C.):
  Water _____ cc__ 1000
  Potassium chrome alum _____ grams__ 30.0
Step 8.—Wash, 5 minutes.
Step 9.—Bleach, 8 minutes (20° C.):
  Water _____ cc__ 750.0
  Potassium ferricyanide _____ grams__ 60.0
  Potassium bromide _____ do____ 15.0
  Dibasic sodium phosphate _____ do____ 13.0
  Sodium bisulfate _____ do____ 6.0
  Water to make 1000 cc.
Step 10.—Wash, 3 minutes.
Step 11.—Fix, 5 minutes (20° C.):
  Water _____ cc__ 1000
  Sodium thiosulfate _____ grams__ 200.0
Step 12.—Wash, 5 minutes.
Step 13.—Masking solution, 3 to 5 minutes (20° C.):
  1.91 parts of sulfanilic acid (monohydrate) is dissolved in 500 parts of warm water. The solution is cooled quickly to 5° C., acidified with 1.5 parts of concentrated hydrochloric acid and diazotized with 0.7 part of sodium nitrite in 25 parts of water. The pH of the diazonium salt solution is adjusted to approximately 5 by the addition of 0.4 part of sodium acetate (trihydrate).
Step 14.—Wash, 15 minutes.

The film contains positive azomethine dye images in the blue and green sensitive layers and a positive cyan quinonimine dye image in the red sensitive layer in combination with negative yellow and red azo dye images in the green and red sensitive layers respectively. As in Example I, no masking image is produced in the blue sensitive layer.

*Example III*

The coated material and procedure is the same as in Example I, excepting that the color former, 1-phenyl-3-heptadecyl-5-pyrazolone-4-sulfonic acid is omitted. In this case, the material is bathed after Step 8 in the following solution for a predetermined period of time ranging from 15 seconds to 5 minutes:

| | |
|---|---|
| Water _____cc__ | 1000 |
| Formaldehyde (36%)_____cc__ | 25.0 |
| Sodium bicarbonate_____grams__ | 2.0 |

This treatment partially blocks the coupling position of the pyrazolone magenta color former 1-(4'-phenoxy-3'-sulfophenyl)-3-heptadecylpyrazolone which does not contain the sulfonic acid group in the 4-position. In this manner it is possible to adjust the yellow masking image which is produced in the subsequent coupling step to the desired density.

*Example IV*

The procedure is the same as in Example II, excepting that after Step 12, the film is bathed in the formaldehyde solution of Example III for a period of time ranging from 15 seconds to 5 minutes. At noted in Example III this provides an additional or alternative control in the masking treatment.

As is evident from what has been said, my invention as hereinabove described contemplates the masking of both the magenta and cyan color developed images, while insuring careful control of the color density and gradation of the masking images. It is to be understood, however, that my invention embraces generally the formation of masks in the processing of color film by the color forming development method while utilizing the diazo procedure, and more particularly the use of such procedure for the selective formation of the masks in the layers desired.

If, for example, a mask is desired in only the magenta layer without specific regard to the density and gradation of the mask, this may be effected by proceeding as above but while utilizing in the blue sensitive layer an acylacetanilide as heretofore described, in the green sensitive layer a single pyrazolone as heretofore mentioned having no replaceable substituent in the coupling position, and in the red sensitive layer a single α-naphthoic acid amide as heretofore described containing a replaceable substituent in the coupling position. With such film a diazonium salt solution as contemplated herein, when buffered to a pH below 6, will yield only a yellow mask in the green sensitive layer. Similarly, if a mask is desired only in the red sensitive layer without particular regard to its density or gradation, the single pyrazolone color former in the green sensitive layer will contain a replaceable substituent in the coupling position and the single α-naphthoic acid coupler in the cyan layer will contain no substituent in the coupling position. By using such film and processing as defined in the examples, a red azo dye mask will be formed only in the red sensitive layer.

Should it be desired to form a mask of controlled color density and gradation in only the green sensitive layer, then such layer would contain a mixture of color formers as above, whereas the red sensitive layer would contain a single color former in which the coupling position is blocked. Conversely, if the mask were to be formed only in the red sensitive layer, then the green sensitive layer would contain only a single color former in which the coupling position is blocked; whereas the red sensitive layer would contain a mixture of color formers of the type required by the examples.

It is of course evident that in lieu of the specific yellow color formers referred to in Example I, there may be used any of the acylacetanilides previously listed. Similarly, the magenta color formers may be a mixture of any of those mentioned so long as the mixture contains a pyrazolone with a substituent in the coupling position and a pyrazolone free from a substituent in such position. The same is also true of the various cyan color formers listed above.

The ratio of substituted to unsubstituted color formers must be determined empirically because the characteristics of the masking images depend on many factors; such as, diazo coupling rate, color former concentration, etc. For example, in one set of experiments it has been found that good results are obtained if the unsubstituted and substituted naphthoic acid amides are present in a ratio of (1:1). It appears that the ratio may be as high as (10:1) or as low as (1:10) depending on the desired density and gradation of the masked images.

Furthermore, as the diazonium salt there may be employed any of those referred to herein in lieu of that derived from sulfanilic acid.

Film packs containing the so-called conventional arrangement of color formers and sensitized layers have been described herein, e. g., the blue, green and red sensitive layers contain yellow, magenta and cyan dye producing color formers, respectively. However, it is obvious to those skilled in the art that for the step of color analysis the above arrangement may be modified if the masked color transparencies are to be utilized subsequently for preparation of color prints or positive transparencies in true color. For example, the cyan, yellow and magenta color formers may be incorporated in the blue, green and red sensitive layers respectively of the multilayer material which is to be masked; it is to be understood, however, that if the original object is to be rendered in true color, the modified masked transparency must be exposed onto a printing material in which the magenta, cyan and yellow color formers are incorporated in the blue, green and red sensitized layers respectively.

This invention, therefore, pertains to the method by which the dye images produced during color development can be corrected for their imperfect spectral characteristics, and is not restricted to any specified arrangement of the color formers in the sensitized layers or to any specified position of the layers in respect to each other.

Various modifications of the invention will occur to persons skilled in the art. For instance, while the invention has been described above in connection with the color development method yielding azomethine and quinonimine dye images, it is apparent that it may likewise be utilized in the masking of azine dye images produced by color development according to the method described in the application of Schmidt and Tulagin, now U. S. P. 2,486,440, granted November 1, 1949, and entitled "Production of Phenazonium Dyestuff Images."

I claim:

1. A multilayer photographic material capable of having printing masks formed therein comprising superimposed silver halide emulsion layers, each of which is sensitized for a different primary color, one of which contains as the color former, an acylacetanilide fast to diffusion in the emulsion, another emulsion layer containing as the color former, a color former fast to diffusion in the emulsion, capable of reacting with the oxidation products of a primary amino developing agent to yield a cyan dye image, and the third emulsion layer containing as the color former, a pyrazolone fast to diffusion in the emulsion which is unsubstituted in the coupling position and capable of reacting with the oxidation products of a primary amino developing agent to yield a magenta dye image and capable of reacting with a diazonium salt to yield an azo dye, said third emulsion layer containing another pyrazolone color former fast to diffusion in which the coupling position is substituted by a replaceable substituent selected from the class consisting of sulfonic acid groups and chlorine and bromine atoms which permits coupling with said oxidation products but renders it incapable of reacting with said diazonium salt solution.

2. A multilayer material according to claim 1 wherein the replaceable substituent in the coupling position of the pyrazolone is a sulfonic acid group.

3. A multilayer material according to claim 1 wherein the replaceable substituent in the coupling position of the pyrazolone is a chlorine atom.

4. A multilayer material according to claim 1 wherein the replaceable substituent in the coupling position of the pyrazolone is a bromine atom.

5. A multilayer photographic material capable of yielding printing masks comprising superimposed silver halide emulsion layers, the outermost being sensitized to blue and containing as the color former, a benzoylacetanilide fast to diffusion in the emulsion, the innermost layer being sensitized for red and containing as color formers, two α-hydroxynaphthoic acid amides fast to diffusion in the emulsion, both color formers being capable of reacting with the oxidation products of a primary amino developing agent to yield a cyan dye image, one of said color formers being unsubstituted in the coupling position and capable of reacting with the diazonium salt solution to yield an azo dye, the other of said color formers being substituted in the coupling position by a replaceable substituent selected from the class consisting of sulfonic acid groups and chlorine and bromine atoms which renders it incapable of reacting with said diazonium salt solution, the intermediate layer being sensitized for green and containing as color formers, two pyrazolones fast to diffusion in the emulsion, both pyrazolones being capable of reacting with the oxidation products of a primary amino developing agent to form a magneta dye image, one of said pyrazolones being unsubstituted in the coupling position and capable of reacting with a diazonium salt to form an azo dye, the other pyrazolone containing a replaceable substituent selected from the class consisting of sulfonic acid groups and chlorine and bromine atoms in the coupling position which permits coupling with said oxidation products but renders it incapable of reacting with said diazonium salt solution.

6. A multilayer material according to claim 5 wherein the replaceable substituent in the coupling position of the pyrazolone is a sulfonic acid group.

7. A multilayer material according to claim 5 wherein the replaceable substituent in the coupling position of the pyrazolone is a chlorine atom.

8. A multilayer material according to claim 5 wherein the replaceable substituent in the coupling position of the pyrazolone is a bromine atom.

References Cited in the file of this patent

UNITED STATES PATENTS

| | | |
|---|---|---|
| 2,428,054 | Vittum et al. | Sept. 30, 1947 |
| 2,705,200 | Tulagin | Mar. 29, 1955 |